United States Patent
Beaurepaire et al.

(10) Patent No.: US 12,467,766 B2
(45) Date of Patent: Nov. 11, 2025

(54) APPARATUS AND METHODS FOR PROVIDING AUTONOMOUS VEHICLE NAVIGATION AT INTERSECTIONS

(71) Applicant: HERE GLOBAL B.V., Eindhoven (NL)

(72) Inventors: Jerome Beaurepaire, Nantes (FR); Leon Stenneth, Chicago, IL (US); Jeremy Michael Young, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 336 days.

(21) Appl. No.: 17/969,541

(22) Filed: Oct. 19, 2022

(65) Prior Publication Data

US 2024/0133710 A1    Apr. 25, 2024
US 2024/0230365 A9    Jul. 11, 2024

(51) Int. Cl.
*G01C 21/00*    (2006.01)
*B60W 30/18*    (2012.01)
*B60W 60/00*    (2020.01)
*G06V 20/58*    (2022.01)

(52) U.S. Cl.
CPC ... *G01C 21/3815* (2020.08); *B60W 30/18154* (2013.01); *B60W 60/001* (2020.02); *G01C 21/3837* (2020.08); *G01C 21/3867* (2020.08); *G06V 20/582* (2022.01); *B60W 2420/403* (2013.01); *B60W 2555/60* (2020.02); *B60W 2556/40* (2020.02)

(58) Field of Classification Search
CPC ............ G01C 21/3815; G01C 21/3887; G01C 21/3867; B60W 30/18154; B60W 60/001; B60W 2420/403; B60W 2555/60; B60W 2556/40; G06V 20/582
See application file for complete search history.

(56) References Cited

U.S. PATENT DOCUMENTS

| | | | |
|---|---|---|---|
| 9,709,985 B1 * | 7/2017 | Silver | G05D 1/0088 |
| 9,978,274 B2 * | 5/2018 | Dannenbring | G06F 18/214 |
| 10,859,395 B2 | 12/2020 | Wheeler et al. | |
| 11,046,317 B2 | 6/2021 | Parasuram et al. | |

(Continued)

OTHER PUBLICATIONS

Komol, et. al., "Deep Transfer Learning Based Intersection Trajectory Movement Classification for Big Connected Vehicle Data," Queensland University of Technology, Digital Object Identifier 10.1109/ACCESS 2021, vol. 9, 2021, Oct. 13, 2021, pp. 141830-42.

*Primary Examiner* — Michael V Kerrigan
*Assistant Examiner* — Alexander V Gentile
(74) *Attorney, Agent, or Firm* — Peter H. Yu; HERE GLOBAL B.V.

(57) ABSTRACT

An apparatus, method and computer program product are provided for providing autonomous vehicle navigation at intersections. In one example, the apparatus identifies an intersection associated with at least two road signs having the same sign type and facing the same direction. The apparatus updates map data to include a datapoint that provides a representation of a single road sign at the intersection instead of the at least two road signs, thereby enabling an autonomous vehicle relying on the map data to traverse the intersection to adhere to the single road sign in lieu of the at least two road signs.

20 Claims, 10 Drawing Sheets

(56) References Cited

U.S. PATENT DOCUMENTS

| | | |
|---|---|---|
| 2013/0297124 A1 | 11/2013 | Be et al. |
| 2018/0105174 A1 | 4/2018 | Russell et al. |
| 2019/0377351 A1 | 12/2019 | Phillips et al. |
| 2021/0004313 A1 | 1/2021 | Morley et al. |
| 2021/0172744 A1* | 6/2021 | Raut ........................ G06N 5/04 |

* cited by examiner

APPARATUS AND METHODS FOR PROVIDING AUTONOMOUS VEHICLE NAVIGATION AT INTERSECTIONS

TECHNICAL FIELD

The present disclosure generally relates to the field of autonomous vehicle navigation, associated methods and apparatus, and in particular, concerns, for example, an apparatus configured to provide autonomous vehicle navigation at intersections including road signs the same direction.

BACKGROUND

Autonomous vehicles utilize sensors to identify road signs, analyze information presented by the road signs, and maneuver based on the information. When autonomous vehicles approach an intersection, exterior facing cameras/lidars equipped by the vehicles detect a presence of a stop sign, and in response, the vehicles are instructed to slow to a stop before advancing through the intersection. In certain scenarios, intersections are designed to include multiple road signs of the same type that face the same direction. For example, if a vehicle is approaching an intersection, the intersection may include one stop sign within one corner of the intersection that is the nearest to the vehicle and another stop sign within an opposing corner of the intersection that is the furthest from the vehicle, where both of the stop signs face a direction that opposes a traffic direction of a lane on which the vehicle is disposed. Such intersection may be designed to include a set of road signs that face the same direction, thereby enabling a driver of the vehicle to rely on either one of the road signs for adhering to traffic rules designated for the intersection. However, an intersection including multiple stop signs that face the same direction may be problematic for autonomous vehicles in that an autonomous vehicle traversing such intersection may be instructed to halt twice when traversing the intersection. Instances in which an autonomous vehicle stops within an intersection may be hazardous since an unsuspecting driver may maneuver the vehicle thereof through the intersection and cause the vehicle to collide with the autonomous vehicle. Therefore, there is a need in the art to remedy such issues.

The listing or discussion of a prior-published document or any background in this specification should not necessarily be taken as an acknowledgement that the document or background is part of the state of the art or is common general knowledge.

BRIEF SUMMARY

According to a first aspect, an apparatus comprising at least one processor and at least one non-transitory memory including computer program code instructions is described. The computer program code instructions, when executed, cause the apparatus to: identify an intersection associated with at least two road signs having the same sign type and facing the same direction; and update map data to include a datapoint that provides a representation of a single road sign at the intersection instead of the at least two road signs.

According to a second aspect, a non-transitory computer-readable storage medium having computer program code instructions stored therein is described. The computer program code instructions, when executed by at least one processor, cause the at least one processor to: identify an intersection associated with at least two road signs having the same sign type and facing the same direction; and update map data to include a datapoint indicating an autonomous vehicle maneuver instruction, wherein the autonomous vehicle maneuver instruction instructs an autonomous vehicle traversing the intersection to not stop within the intersection.

According to a third aspect, a method of providing autonomous vehicle navigation is described. The method includes: receiving sensor data from an autonomous vehicle; determining whether the sensor data indicate detection of at least two road signs having the same sign type and facing the same direction within an intersection or within one or more peripherals of the intersection; and responsive to the sensor data indicating the detection, generating an autonomous vehicle maneuver signal, wherein the autonomous vehicle maneuver signal causes the autonomous vehicle to not stop within the intersection.

Also, a computer program product may be provided. For example, a computer program product comprising instructions which, when the program is executed by a computer, cause the computer to carry out the steps described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings.

DETAILED DESCRIPTION

Figure 1:
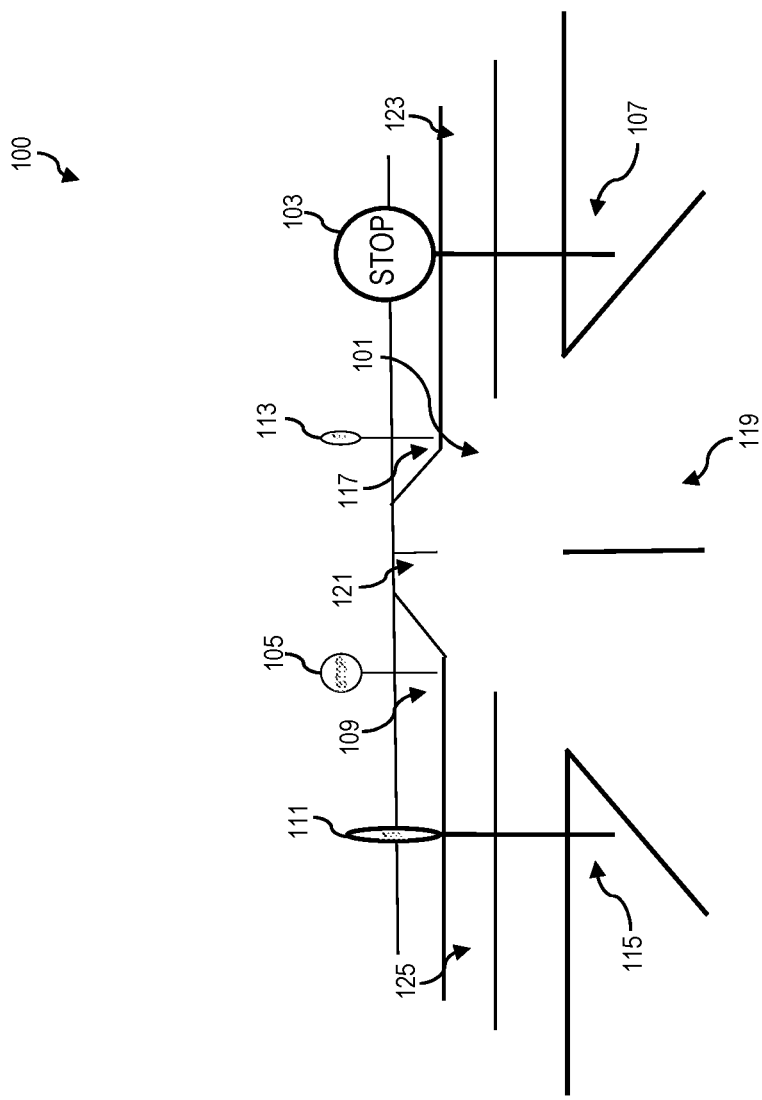
FIG. 1 illustrates a perspective view of an example intersection including sets of multiple road signs of the same type that are facing the same direction.

As discussed above, an autonomous vehicle may stop within an intersection including multiple road sign facing the same direction, thereby rendering a hazardous situation therein. Details of such situation will be described in detail with reference to FIG. 1. FIG. 1 illustrates a perspective view 100 of an example intersection 101 including multiple road signs of the same type that are facing the same direction. In the illustrated example, a first set of stop signs 103 and 105 is disposed within peripherals of the intersection 101. The first stop sign 103 is disposed within a first corner 107, and the second stop sign 105 is disposed within a second opposing corner 109. A second set of stop signs 111 and 113 is also disposed within the peripherals of the intersection 101. Specifically, the third stop sign 111 is disposed within a third corer 115, and the fourth stop sign 113 is disposed within a fourth corner 117. The sign faces of the first set of stop signs 103 and 105 are perpendicular to road segments 119 and 121, and the sign faces of the second set of stop signs 111 and 113 are perpendicular to road segments 123 and 125. Each of the first set of stop signs 103 and 105 and the second set of stop signs 111 and 113 is double sided. As such, drivers or sensors of vehicles will observe two stop signs when the vehicles approach the intersection 101 from the road segments 119, 121, 123, and 125. When an autonomous vehicle approaches the intersection 101 from the first road segment 119, the autonomous vehicle observes the first stop sign 103 and is instructed to slow to a stop. As the autonomous vehicle moves towards the second road segment 121, the autonomous vehicle observes the second stop sign 105 and is again instructed to slow to a stop. As such, the autonomous vehicle temporarily stops within the intersection 101 prior to reaching the second road segment 121. During the period in which the autonomous vehicle is temporarily stationary within the intersection 101, an unsuspecting driver of vehicle that is traversing the intersection 101 may not anticipate such action of the autonomous vehicle within the intersection 101. As such, the likelihood in which the vehicle collides with the autonomous vehicle is increased. A system, apparatus, and methods for remedying such issues will be described in detail, herein.

Figure 2:
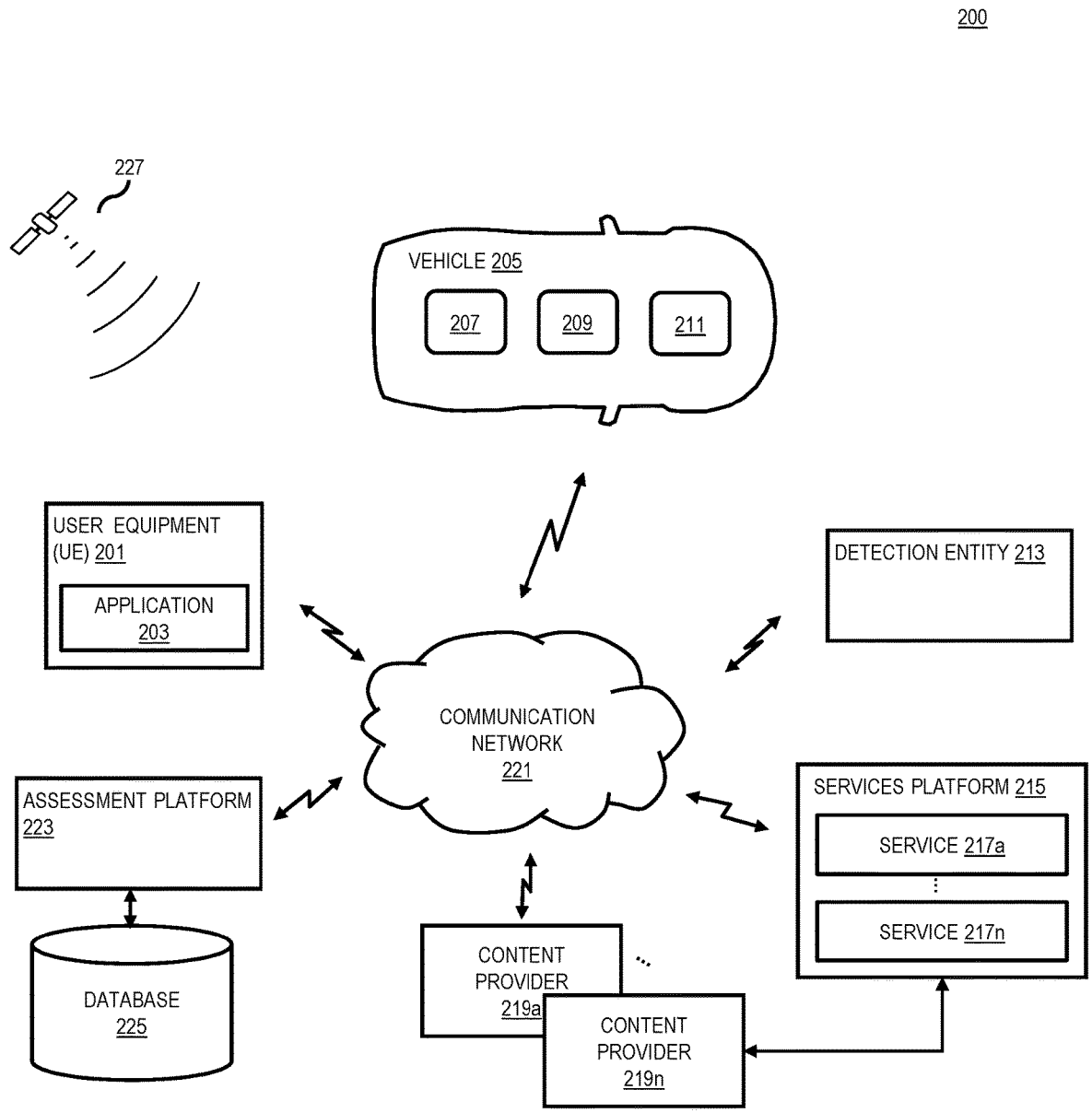
FIG. 2 illustrates a system capable of providing autonomous vehicle navigation at intersections.

FIG. 2 is a diagram of a system 200 capable of providing autonomous vehicle navigation at intersections, according to one embodiment. Such events will be referred as aggressive driver behavior events, herein. The system includes a user equipment (UE) 201, a vehicle 205, a detection entity 213, a services platform 215, content providers 219a-219n, a communication network 221, an assessment platform 223, a database 225, and a satellite 227. Additional or a plurality of mentioned components may be provided.

In the illustrated embodiment, the system 200 comprises a user equipment (UE) 201 that may include or be associated with an application 203. In one embodiment, the UE 201 has connectivity to the assessment platform 223 via the communication network 121. The assessment platform 223 performs one or more functions associated with providing autonomous vehicle navigation at intersections. In the illustrated embodiment, the UE 201 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with a vehicle (e.g., as part of an infotainment system of the vehicle), or any combination thereof, including the accessories and peripherals of these devices. In one embodiment, the UE 201 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 201 can be a cellular telephone. A user may use the UE 201 for navigation functions, for example, road link map updates. It should be appreciated that the UE 201 can support any type of interface to the user (such as "wearable" devices, etc.).

In the illustrated embodiment, the application 203 may be any type of application that is executable by the UE 201, such as a mapping application, a location-based service application, a navigation application, a content provisioning service, a camera/imaging application, a media player application, a social networking application, a calendar application, or any combination thereof. In one embodiment, one of the applications 203 at the UE 201 may act as a client for the assessment platform 223 and perform one or more functions associated with the functions of the assessment platform 223 by interacting with the assessment platform 223 over the communication network 221. The application 203 may be used convey information regarding locations of intersections having multiple road signs, where each of the intersections include at least two road signs that face the same direction. The information may further indicate attributes associated with the intersections, the road signs, and/or road segments connected to the intersections, map data corresponding to the intersections, data instructing how autonomous vehicles should respond to detecting the multiple road signs within the intersections, or a combination thereof. The application 203 may also be used by users for reporting incidences in which autonomous vehicles erroneously stop within the intersections.

The vehicle 205 may be a standard gasoline powered vehicle, a hybrid vehicle, an electric vehicle, a fuel cell vehicle, and/or any other mobility implement type of vehicle. The vehicle 205 includes parts related to mobility, such as a powertrain with an engine, a transmission, a suspension, a driveshaft, and/or wheels, etc. The vehicle 205 is an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle 205 may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle 205, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle. It should be appreciated that the autonomous level of the vehicle is at least Level 1.

In one embodiment, the vehicle 205 may be a highly assisted driving (HAD) vehicle or an advanced driving assistance systems (ADAS) vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle 205 may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In one embodiment, the vehicle 205 includes sensors 207, an on-board communication platform 209, and an on-board computing platform 211. The sensors 207 may include image sensors (e.g., electronic imaging devices of both analog and digital types, which include digital cameras, camera modules, camera phones, thermal imaging devices, radar, sonar, lidar, etc.), a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, traction sensor, suspension sensor, tilt sensors to detect the degree of incline or decline of the vehicle 205 along a path of travel, etc. In a further embodiment, one or more of the sensors 207 about the perimeter of the vehicle 205 may detect the relative distance of the vehicle 205 from stationary objects (e.g., construct, wall, etc.), road objects, lanes, or roadways, the presence of other vehicles, pedestrians, traffic lights, road features (e.g., curves) and any other objects, or a combination thereof. Said sensors 207 may also detect orientations of such objects. In one embodiment, the vehicle 205 may include GPS receivers to obtain geographic coordinates from satellites 227 for determining current location and time associated with the vehicle 205. Further, the location can be determined by a triangulation system such as A-GPS, Cell of Origin, or other location extrapolation technologies.

The on-board communications platform 209 includes wired or wireless network interfaces to enable communication with external networks. The on-board communications platform 209 also includes hardware (e.g., processors, memory, storage, antenna, etc.) and software to control the wired or wireless network interfaces. In the illustrated example, the on-board communications platform 209 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11 ad), etc.). In some examples, the on-board communications platform 109 includes a wired or wireless interface (e.g., an auxiliary port, a Universal Serial Bus (USB) port, a Bluetooth® wireless node, etc.) to communicatively couple with the UE 201.

The on-board computing platform 211 performs one or more functions associated with the vehicle 205. In one embodiment, the on-board computing platform 209 may aggregate sensor data generated by at least one of the sensors 207 and transmit the sensor data via the on-board communications platform 209. The on-board computing platform 209 may receive control signals for performing one or more of the functions from the assessment platform 223, the UE 201, the services platform 215, one or more of the content providers 219a-219n, or a combination thereof via the on-board communication platform 211. The on-board computing platform 211 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The detection entity 213 may be another vehicle, a drone, a user equipment, a road-side sensor, or a device mounted on a stationary object within or proximate to a road segment (e.g., a traffic light post, a sign post, a post, a building, etc.). The detection entity 213 includes one or more image sensors such as electronic imaging devices of both analog and digital types, which include digital cameras, camera modules, camera phones, thermal imaging devices, radar, sonar, lidar, etc. The detection entity 213 may further include a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the degree of incline or decline of the detection entity 213 along a path of travel, etc. In a further embodiment, sensors about the perimeter of the detection entity 213 may detect the relative distance of the detection entity 213 from road objects, lanes, or roadways, the presence of other vehicles, pedestrians, traffic lights, road features (e.g., curves) and any other objects, or a combination thereof. Said sensors may also detect orientations of such objects. In one embodiment, the detection entity 213 may include GPS receivers to obtain geographic coordinates from satellites 227 for determining current location and time associated with the detection entity 213. Further, the location can be determined by a triangulation system such as A-GPS, Cell of Origin, or other location extrapolation technologies. The detection entity 213 may further include a receiver and a transmitter for maintaining communication with the assessment platform 223 and/or other components within the system 100.

The services platform 215 may provide one or more services 217a-217n (collectively referred to as services 217), such as mapping services, navigation services, travel planning services, weather-based services, emergency-based services, notification services, social networking services, content (e.g., audio, video, images, etc.) provisioning services, application services, storage services, contextual information determination services, location-based services, information-based services, etc. In one embodiment, the services platform 215 may be an original equipment manufacturer (OEM) platform. In one embodiment the one or more service 217 may be sensor data collection services. By way of example, vehicle sensor data provided by the sensors 207 may be transferred to the UE 201, the assessment platform 223, the database 225, or other entities communicatively coupled to the communication network 221 through the service platform 215. In one embodiment, the services platform 215 uses the output data generated by of the assessment platform 223 to provide services such as navigation, mapping, other location-based services, etc.

In one embodiment, the content providers 219a-219n (collectively referred to as content providers 219) may provide content or data (e.g., including geographic data, parametric representations of mapped features, etc.) to the UE 201, the vehicle 205, services platform 215, the vehicle 205, the database 225, the assessment platform 223, or the combination thereof. In one embodiment, the content provided may be any type of content, such as map content, textual content, audio content, video content, image content, etc. In one embodiment, the content providers 219 may provide content that may aid in providing autonomous vehicle navigation at intersections, and/or other related characteristics. In one embodiment, the content providers 219 may also store content associated with the UE 201, the vehicle 205, services platform 215, the assessment platform 223, the database 225, or the combination thereof. In another embodiment, the content providers 219 may manage access to a central repository of data, and offer a consistent, standard interface to data, such as a repository of the database 225.

The communication network 221 of system 200 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the assessment platform 223 may be a platform with multiple interconnected components. The assessment platform 223 may include multiple servers, intelligent networking devices, computing devices, components and corresponding software for providing autonomous vehicle navigation at intersections. It should be appreciated that the assessment platform 223 may be a separate entity of the system 200, included within the UE 201 (e.g., as part of the applications 203), included within the vehicle 205 (e.g., as part of an application stored in the memory of the on-board computing platform 211), included within the services platform 215 (e.g., as part of an application stored in server memory for the services platform 215), included within the content providers 219 (e.g., as part of an application stored in sever memory for the content providers 219), other platforms embodying a power supplier (not illustrated), or a combination thereof.

The assessment platform 223 maintains map data and updates the same based on data, such as sensor data, acquired by probes (e.g., detection entities 213). The assessment platform 223 may also provide autonomous vehicle maneuver instructions based on locations of autonomous vehicles and sensor data acquired by the same. In one embodiment, the assessment platform 223 maintains map data indicating attributes of intersections, such as: (1) a type of intersection; (2) a functional class of an intersection; (3) a number of road segments connected to an intersection; (4) dimensions of an intersection; (5) a number of lanes accommodated by an intersection; (6) curvatures of an intersection; (7) road markings within an intersection (e.g., lane markings, crosswalk markings, bike lane markings, etc.); or (8) a combination thereof. In one embodiment, the map data may also indicate one or more attributes of one or more road signs associated with each of the intersection. Herein, a road sign associated with an intersection should be construed as the road sign being disposed within the intersection, the road sign being within one or more peripherals of the intersection, or a combination thereof. A road sign associated with an intersection should be construed as the road sign being designated for directing traffic rules or providing information relevant for the intersection.

In one embodiment, the assessment platform 223 acquires information on attributes of intersections and road signs associated therewith from one or more detection entities 213 that traverse the locations of the intersections or is positioned within or proximate to the intersections. Such detection entities 213 may be equipped with image sensors, such as cameras, for capturing images of said attributes and transmit the images to the assessment platform 223 for further processing. In one embodiment, the assessment platform 223 may acquire information on attributes of intersections and road signs associated therewith from the database 225, services platform 215, content provider 219, or other third-party data source.

In one embodiment, the assessment platform 223 queries map data to identify intersections that include at least two road signs of the same type that face the same direction. In such embodiment, the map data is maintained by the assessment platform 223 to include attributes of intersections and attributes of road signs associated with the intersection. The map data may be maintained to include datapoints that indicate intersections, where each of the intersections include at least two road signs of the same type that face the same direction. For each intersection including at least two road signs of the same type that face the same direction, the assessment platform 223 defines a polygon corresponding to a zone in which autonomous vehicles are instructed to not stop therein. That is, the polygon defines a zone is in which autonomous vehicle maneuver instructions for not stopping are provided to and executed by autonomous vehicle traversing the zone. The shape of the polygon may correspond to the curvatures of the intersection, lane markings within the intersection, or a combination thereof. In one embodiment, the shape of the polygon may be modified based on user preference (e.g., a user that manages map data).

Figure 3:
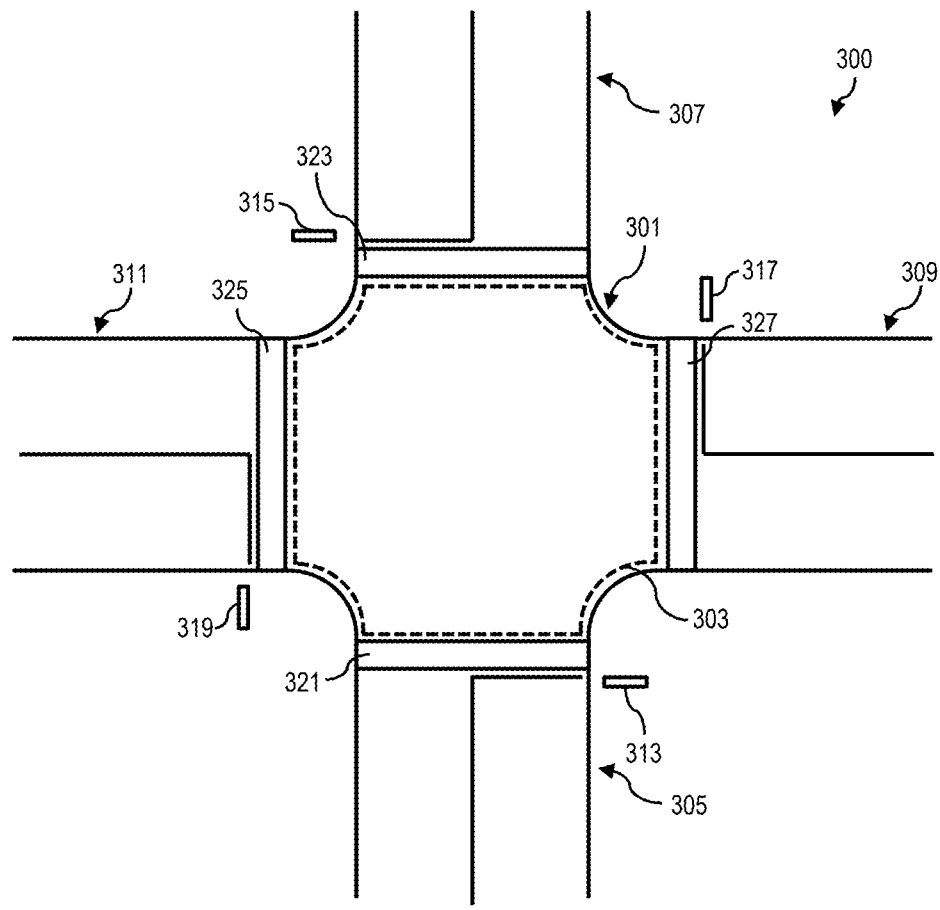
FIG. 3 illustrates a plan view of an example intersection and a polygon defined within the intersection.

FIG. 3 illustrates a plan view 300 of an example intersection 301 and a polygon 303 defined within the intersection 301. In the illustrated example, the intersection 301 is connected to a first road segment 305, a second road segment 307, a third road segment 309, and a fourth road segment 311. The intersection 301 is associated with a first set of stop signs 313 and 315 that is perpendicular to the first road segment 305 and the second road segment 307, and the intersection 301 is further associated with a second set of stop signs 317 and 319. Each of the first set and the second set of stop signs 313, 315, 317, and 319 is double sided. Since the assessment platform 223 has identified the intersection as being associated with at least two road signs of the same type facing the same direction, the assessment platform 223 defines the polygon 303 to correspond to the curvatures of the intersection and the boundaries of crosswalks 321, 323, 325, and 327. Once a polygon is established for an intersection, autonomous vehicles traversing a zone corresponding to the polygon will be instructed to not stop.

It is contemplated that instructions for autonomous vehicles to not stop within a zone corresponding to a polygon will not override other autonomous vehicle maneuver instructions of higher importance. For example, autonomous vehicle maneuver instructions that causes autonomous vehicles to stop in response to detecting a pedestrian or another vehicle within a zone corresponding to a polygon take precedence over instructions for autonomous vehicles to not stop within the zone. In one embodiment, the assessment platform 223 transmits map data and data indicating polygons defined within intersections to autonomous vehicles (e.g., vehicle 105). As such, when the autonomous vehicle approaches intersections including the polygons, the autonomous vehicles are instructed to not stop as the vehicles traverse zones defined by the polygons. In one embodiment, the assessment platform 223 may receive periodically receive location data associated with autonomous vehicles and compare the location of the autonomous vehicles with respect to locations of polygons within a map. If the location data indicate that an autonomous vehicle is approaching an intersection having a polygon defined within the intersection, the assessment platform 223 may transmit an autonomous vehicle maneuver instruction signal to the autonomous vehicle such that the vehicle does not stop while the vehicle travers a zone defined by the polygon.

In one embodiment, the assessment platform 223 identifies intersections, where each of the intersections include at least two road signs of the same type that face the same direction, by clustering road signs across intersections. To cluster road signs across intersections, the assessment platform 223 determines attributes indicating a size of the intersections, such as a dimension of each of the intersections, a functional class of each of the intersections, or a combination thereof. Based on the attributes, the assessment platform 223 determines an area that is most likely to include road signs associated with the intersection. For example, an intersection with a functional class level of 2 is assigned a greater area than an intersection with a functional class level of 5 (e.g., a functional class level 1 provides the greatest mobility for vehicles and the least amount of land access, whereas a functional class level 5 provides the least mobility for vehicles and the greatest amount of land access). By way of another example, an intersection having a first width is assigned a first area, and an intersection having a second greater width is assigned a second greater area. For each of road signs identified with the area, the assessment platform 223 identifies a road sign type and a direction at which the road sign is facing. The assessment platform 223 determines the direction of the sign face of the road sign such that the assessment platform 223 uses the direction to identify a traffic direction of which the road sign is designated for at the intersection. For example, a road sign facing a southbound direction within an intersection is designated for a northbound traffic direction within a road segment connected to the intersection. Once the attributes of the road signs are determined, the assessment platform 223 clusters two or more road signs of the same type that face the same direction. In one embodiment, for each cluster of road signs, the assessment platform 223 updates map data corresponding to an intersection associated with said cluster such that said cluster is represented as a single road sign within the map data. Once the map data is updated, the assessment platform 223 provides the map data to autonomous vehicles. As such, if an autonomous vehicle is traversing said intersection and detects said cluster, the autonomous vehicle treats the detection of the cluster as detection of a single road sign, thereby preventing an instance in which the autonomous vehicle stops within the intersection.

In one embodiment, the assessment platform 223 classifies authoritative road signs and informative road signs identified at intersections and instructs autonomous vehicles to only adhere to authoritative road signs when traversing said intersections. In one embodiment, an authoritative road sign may be a road sign that is initially detected by an autonomous vehicle at an intersection, and an informative road sign may be a road sign that is subsequently detected by an autonomous vehicle at the intersection. In one embodiment, an authoritative sign may be a road sign that is nearest to an autonomous vehicle when the autonomous vehicle approaches an intersection associated with the road sign from a road segment connected to the intersection. Authoritative and informative road signs may be two or more road signs associated with an intersection, where said road signs are of the same type and are facing the same direction. In one embodiment, the assessment platform 223 embodies a machine learning model for classifying road signs and trains the machine learning model based on a training data set including various attributes of intersections and road signs associated therewith. By way of example such attributes may be: (1) distances between road signs; (2) intersection geometry; (3) sign type and/or value of sign; (4) travel directions associated with an intersection; (5) a functional class of an intersection; (6) a number of lanes of each road segment connected to an intersection; (7) presence of one or more crosswalks within an intersection; (8) presence of one or more bike lanes within an intersection or one or more road segments connected to the intersection; (9) presence of traffic lights; (10) road topology; or (11) a combination thereof. In one embodiment, the training data set may include data indicating a road sign that was initially detected by an autonomous vehicle when the autonomous vehicle was approaching an intersection associated with the road sign from a road segment connected to the intersection. Based on such data and the attributes of intersections and road signs, the machine learning model is trained to classify authoritative signs and informative signs. By way of example, if the machine learning model receives data indicating attributes of intersections and road signs as illustrated in FIG. 3, and the machine learning model may generate output data indicating that the sign 313 is authoritative and the sign 315 is informative in that traffic moving from the first road segment 305 to the second road segment 307 observes the sign 313 before the sign 315. Once the machine learning model has been trained, transfer learning may be applied to locations in which training data set are not available. Machine learning model incorporating transfer learning may be used as a baseline model until data can be collected in such locations and the model can then be adapted to better match the local environment. For example, prior knowledge acquired from intersections within one city can be used to train the model, and the model can be applied in a newly built city with similar intersection designs without requiring new training data set to train the model locally.

Figure 4:
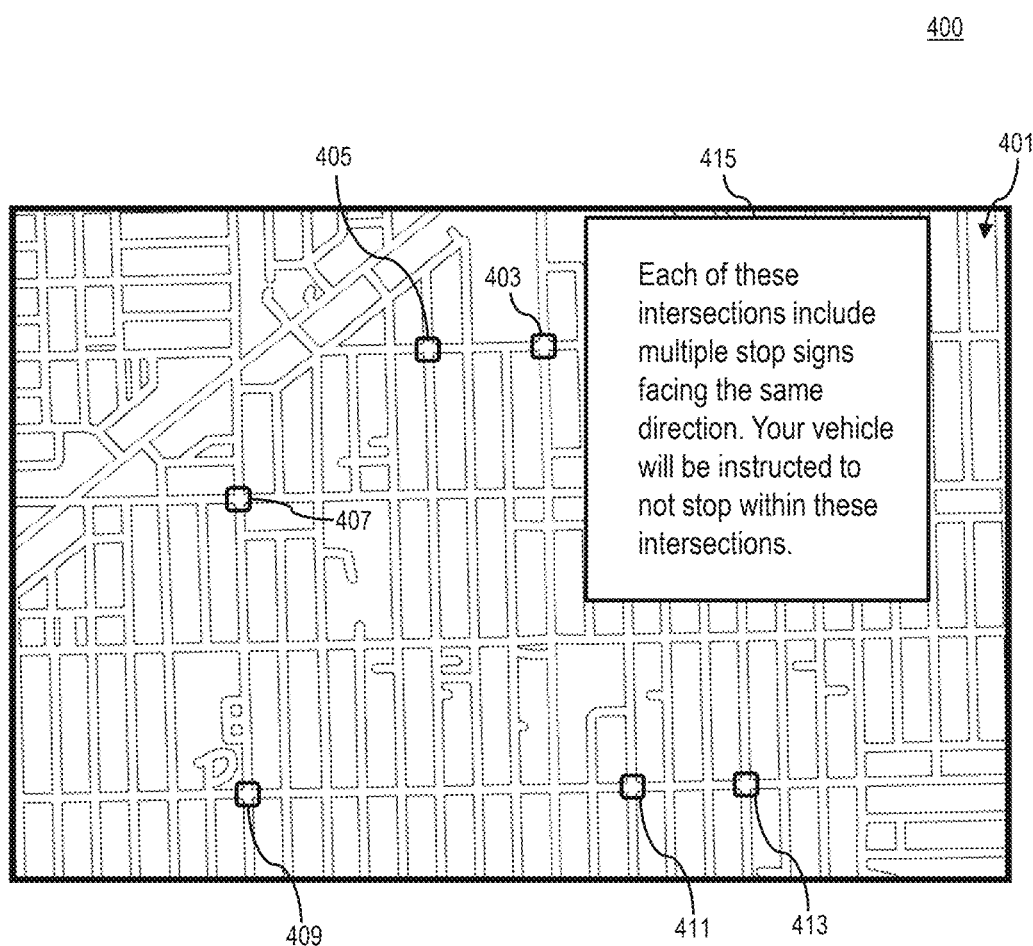
FIG. 4 illustrates an example visual representation of a map.

Once map data are updated to indicate intersections including road signs of same type that face the same direction, the assessment platform 223 provides the map data to UE 201, the vehicle 205, or other requesting entities. In one embodiment, the assessment platform 223 uses the map data to provide routing for autonomous vehicles. By way of example, the assessment platform 223 may identify an intersection including road signs of the same type that are facing the same direction and generate a route for an autonomous vehicle that avoids the location of the intersection. In one embodiment, the assessment platform 223 generates notifications and/or other types of information based on the map data. The assessment platform 223 may transmit the notifications to the UE 201, the vehicle 205 and/or a user interface associated with the vehicle 205. The notification may include sound notification, display notification, vibration, or a combination thereof. In one embodiment, the assessment platform 223 may provide a sound notification or a display notification to an occupant of an autonomous vehicle via a user interface, where such notification indicates that the autonomous vehicle will detect two road signs at an intersection and adhere to only one of the road signs, thereby providing assurance to the occupant that the vehicle is capable of traversing the intersection without error. In one embodiment, the assessment platform 223 may cause the UE 201 and/or the user interface associated with the vehicle 205 to generate a visual representation. For example, FIG. 4 illustrates an example visual representation 400 of map 401. In the illustrated example, the map 401 includes highlighted areas 403, 405, 407, 409, 411, and 413, where each of the areas indicate an intersection including multiple road signs facing the same direction. Autonomous vehicles that will be traversing the areas will be instructed to not stop within the corresponding intersections. As such, the visual representation includes a message 415 stating "EACH OF THESE INTERSECTIONS INCLUDE MULTIPLE STOP SIGNS FACING THE SAME DIRECTION. YOUR VEHICLE WILL BE INSTRUCTED TO NOT STOP WITHIN THESE INTERSECTIONS."

The assessment platform 223 can be implemented in hardware, firmware, software, or a combination thereof. Though depicted as a separate entity in FIG. 2, it is contemplated that the assessment platform 223 may be implemented for direct operation by the UE 201, the vehicle 205, the services platform 215, one or more of the content providers 219, or a combination thereof. As such, the assessment platform 223 may generate direct signal inputs by way of the operating system of the UE 201, the vehicle 205, the services platform 215, the one or more of the content providers 219, or the combination thereof for interacting with the applications 203. The various executions presented herein contemplate any and all arrangements and models.

In the illustrated embodiment, the database 225 stores information on road links (e.g., road length, road breadth, slope information, curvature information, geographic attributes, etc.), probe data for one or more road links (e.g., traffic density information), POIs, and other types map-related features. In one embodiment, the database 225 may include any multiple types of information that can provide means for aiding in providing autonomous vehicle navigation at intersections. It should be appreciated that the information stored in the database 225 may be acquired from any of the elements within the system 200, other vehicles, sensors, database, or a combination thereof.

In one embodiment, the UE 201, the vehicle 205, the detection entity 213, the services platform 215, the content providers 219, the assessment platform 223 communicate with each other and other components of the communication network 221 using well known, new or still developing protocols. In this context, a protocol includes a set of rules defining how the network nodes within the communication network 221 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 5:
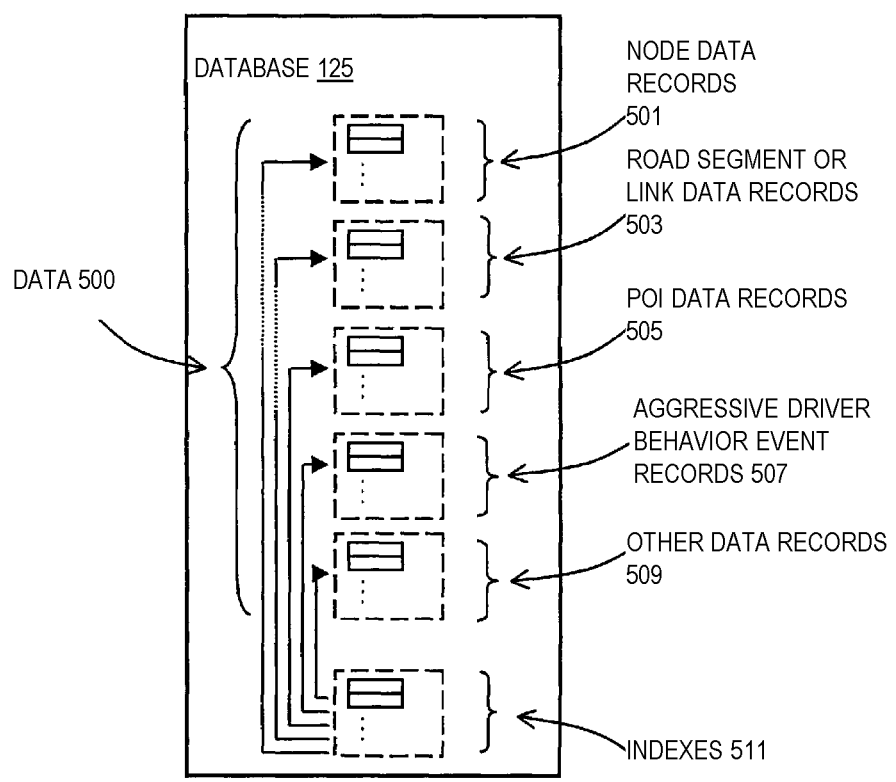
FIG. 5 illustrates a diagram of a database.

FIG. 5 is a diagram of a database 225 (e.g., a map database), according to one embodiment. In one embodiment, the database 225 includes data 500 used for (or configured to be compiled to be used for) mapping and/or navigation-related services, such as for personalized route determination, according to exemplary embodiments.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the database 125.

"Node"—A point that terminates a link.

"Line segment"—A line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the database 225 follows certain conventions. For example, links do not cross themselves and do not cross each other except at a node or vertex. Also, there are no duplicated shape points, nodes, or links. Two links that connect each other have a common node or vertex. In the database 225, overlapping geographic features are represented by overlapping polygons. When polygons overlap, the boundary of one polygon crosses the boundary of the other polygon. In the database 225, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the database 225 is presented according to a hierarchical or multi-level tile projection. More specifically, in one embodiment, the database 225 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grids. Because of the numbering system, the exact position of any tile in any level of the map tile grid or projection may be uniquely determined from the tile ID.

As shown, the database 225 includes node data records 501, road segment or link data records 503, POI data records 505, aggressive driver behavior event records 507, other records 509, and indexes 511, for example. More, fewer or different data records can be provided. In one embodiment, additional data records (not shown) can include cartographic ("carto") data records, routing data, and maneuver data. In one embodiment, the indexes 511 may improve the speed of data retrieval operations in the database 225. In one embodiment, the indexes 511 may be used to quickly locate data without having to search every row in the database 225 every time it is accessed.

In exemplary embodiments, the road segment data records 503 are links or segments representing roads, streets, or paths, as can be used in the calculated route or recorded route information for determination of one or more personalized routes. The node data records 501 are end points (such as intersections) corresponding to the respective links or segments of the road segment data records 503. The road link data records 503 and the node data records 501 represent a road network, such as used by vehicles, cars, and/or other entities. Alternatively, the database 125 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace). The node data records 501 may indicate attributes of intersections, such as: (1) a type of intersection; (2) a functional class of an intersection; (3) a number of road segments connected to an intersection; (4) dimensions of an intersection; (5) a number of lanes accommodated by an intersection; (6) curvatures of an intersection; (7) road markings within an intersection (e.g., lane markings, crosswalk markings, bike lane markings, etc.); (8) intersection geometry; (9) travel directions associated with an intersection; (10) presence of one or more crosswalks within an intersection; (11) presence of one or more bike lanes within an intersection or one or more road segments connected to the intersection; (12) presence of traffic lights; (13) road topology; or (14) a combination thereof. The node data records 501 may also indicate attributes of road signs associated with the intersection. For example, the attributes may indicate: (1) a road sign type; (2) a road sign value; (3) position of a road sign with respect to the associated intersection; (4) orientation of a road sign; (5) whether a road sign is double sided; (6) distances between road signs associated with an intersection; or (7) a combination thereof. In one embodiment, the node data records 501 may also define a polygon within each intersection including multiple road signs of the same type facing the same direction. The polygon defines a zone within the intersection, and autonomous vehicles traversing the zone are instructed to not stop within the zone. In one embodiment, the node data records 501 may define a cluster of road signs associated with an intersection as a single road sign. Specifically, a cluster of road signs of the same type that face the same direction is defined as a single road sign. In one embodiment, the node data records 501 defines each road sign associated with an intersection as being authoritative or informative. In such embodiment, autonomous vehicles are instructed to adhere to authoritative road signs and disregard informative road signs when the vehicles are traversing intersections.

Links, segments, and nodes can be associated with attributes, such as geographic coordinates, a number of road objects (e.g., road markings, road signs, traffic light posts, etc.), types of road objects, traffic directions for one or more portions of the links, segments, and nodes, traffic history associated with the links, segments, and nodes, street names, address ranges, speed limits, turn restrictions at intersections, presence of roadworks, and other navigation related attributes, as well as POIs, such as gasoline stations, hotels, restaurants, museums, stadiums, offices, automobile dealerships, auto repair shops, factories, buildings, stores, parks, etc. The database 225 can include data about the POIs and their respective locations in the POI data records 205. The database 225 can also include data about places, such as cities, towns, or other communities, and other geographic features, such as bodies of water, mountain ranges, etc. Such place or feature data can be part of the POI data records 505 or can be associated with POIs or POI data records 505 (such as a data point used for displaying or representing a position of a city).

Other records 509 may include a training data set for training a machine learning model to define each road sign associated with an intersection as an authoritative road sign or an informative road sign. The training data set may indicate attributes of intersections and road signs associated therewith. Other records 509 may also include autonomous vehicle maneuver instructions that are provided to autonomous vehicles such that the vehicles do not stop when the vehicles traverse an intersection including road signs of the same type that face the same direction.

In one embodiment, the database 225 can be maintained by the services platform 215 and/or one or more of the content providers 219 in association with a map developer. The map developer can collect geographic data to generate and enhance the database 225. There can be different ways used by the map developer to collect data. These ways can include obtaining data from other sources, such as municipalities or respective geographic authorities. In addition, the map developer can employ field personnel to travel by vehicle along roads throughout the geographic region to observe attributes associated with one or more road segments and/or record information about them, for example. Also, remote sensing, such as aerial or satellite photography, can be used.

The database 225 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 205, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for providing autonomous vehicle navigation at intersections may be advantageously implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof.

Figure 6:
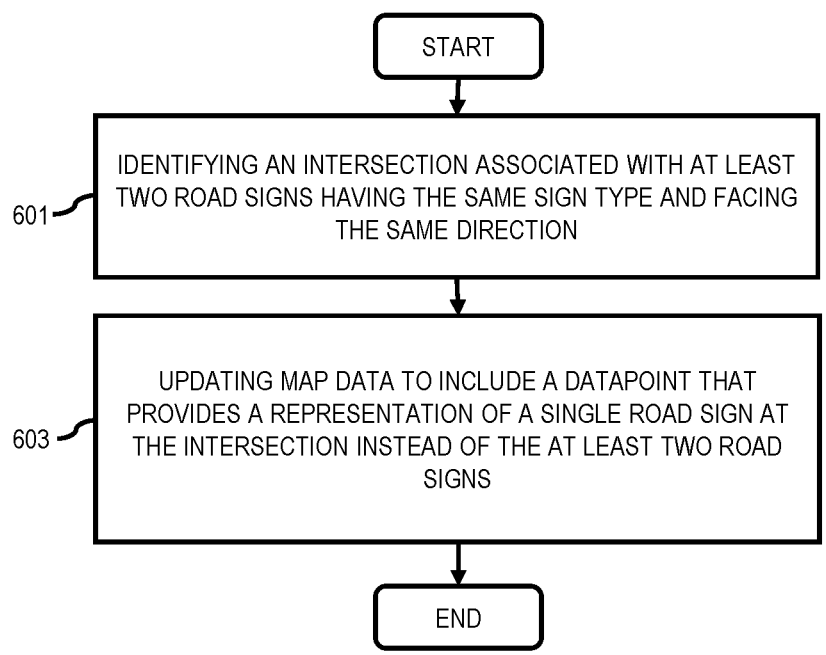
FIG. 6 illustrates a flowchart of a process for providing autonomous vehicle navigation at intersections by updating map data.
Figure 9:
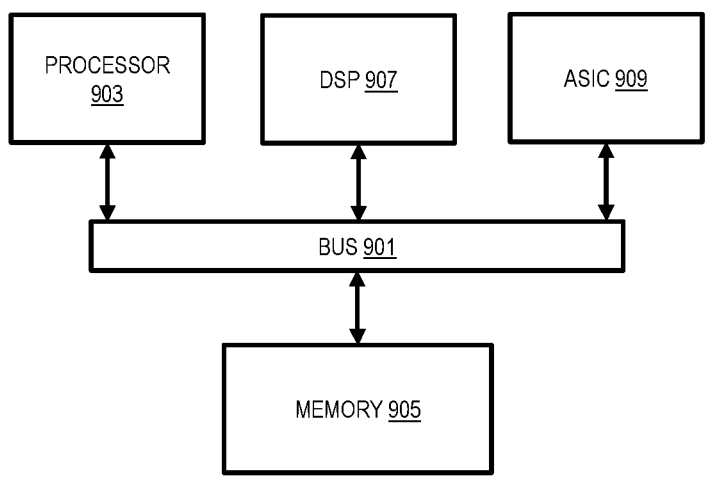
FIG. 9 illustrates a chip set or chip upon which an embodiment may be implemented.

FIG. 6 is a flowchart of a process 600 for providing autonomous vehicle navigation at intersections by updating map data, according to one embodiment. In one embodiment, the assessment platform 223 performs the process 600 and is implemented in, for instance, a chip set including a processor and a memory as shown in FIG. 9.

At step 601, the assessment platform 223 identifies an intersection associated with at least two road signs having the same sign type and facing the same direction. To identify such intersection, the assessment platform 223 queries map data to identify attributes of road signs and intersections. In one embodiment, the assessment platform 223 may determine a functional class of an intersection, determine an area corresponding to the functional class, and identify attributes of each road signs within the area to determine at least two road signs having the same sign type and facing the same direction. In one embodiment, the assessment platform 223 may receive sensor data from one or more detection entities 213 to identify an intersection associated with at least two road signs having the same sign type and facing the same direction.

At step 603, the assessment platform updates the map data to include a datapoint that provides a representation of a single road sign at the intersection instead of the at least two road signs. As such, when the map data is relied upon by an autonomous vehicle that is traversing the intersection, the autonomous vehicle is instructed to adhere to the single road sign instead of the at least two road signs.

Figure 7:
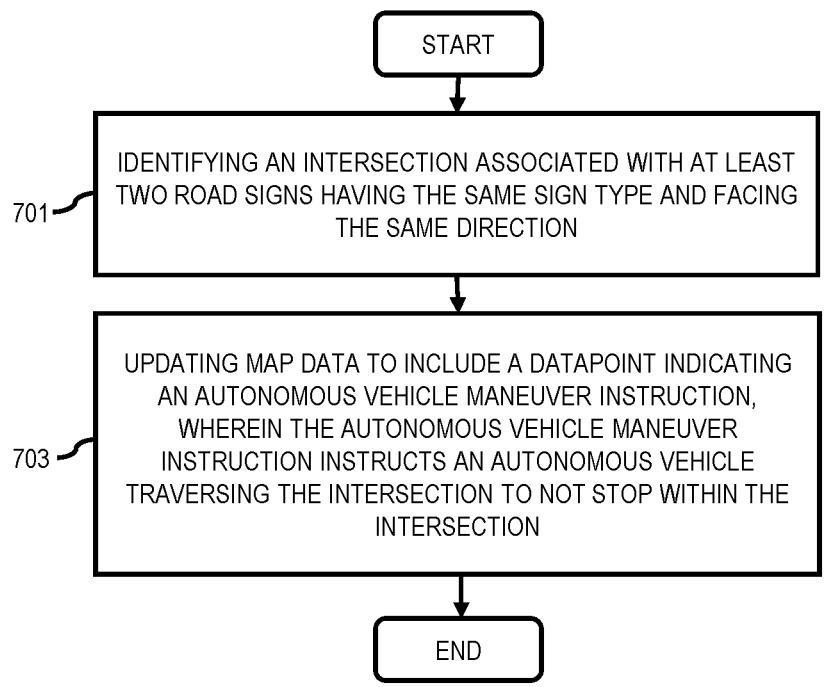
FIG. 7 illustrates a flowchart of a process for providing autonomous vehicle navigation at intersections by providing an autonomous vehicle maneuver instruction.

FIG. 7 is a flowchart of a process 700 for providing autonomous vehicle navigation at intersections by providing an autonomous vehicle maneuver instruction, according to one embodiment. In one embodiment, the assessment platform 223 performs the process 700 and is implemented in, for instance, a chip set including a processor and a memory as shown in FIG. 9.

At step 701, the assessment platform 223 identifies an intersection associated with at least two road signs having the same sign type and facing the same direction. To identify such intersection, the assessment platform 223 may queries map data to identify attributes of road signs and intersections. In one embodiment, the assessment platform 223 may determine a functional class of an intersection, determine an area corresponding to the functional class, identify attributes of each road signs within the area to determine at least two road signs having the same sign type and facing the same direction. In one embodiment, the assessment platform 223 may receive sensor data from one or more detection entities 213 to identify an intersection associated with at least two road signs having the same sign type and facing the same direction.

At step 703, the assessment platform 223 updates map data to include a datapoint indicating an autonomous vehicle maneuver instruction, where the autonomous vehicle maneuver instruction instructs an autonomous vehicle traversing the intersection to not stop within the intersection. In one embodiment, to establish such datapoint, the assessment platform 223 generates a polygon defining a zone within the intersection. As such, when an autonomous vehicle is traversing the zone, the autonomous vehicle receives an autonomous vehicle maneuver instruction and is instructed to not stop. For example, if an autonomous vehicle observes a first stop sign associated with an intersection, the autonomous vehicle is instructed to stop before entering the intersection. As the autonomous vehicle traverses a zone defined by a polygon and observes a second stop sign associated with the intersection, the autonomous vehicle receives an autonomous vehicle maneuver instruction and is instructed to not stop.

The system, apparatus, and methods described herein updates map data and/or provide autonomous vehicle navigation at an intersection including road signs of the same type that face the same direction, thereby enabling autonomous vehicles to safely traverse the intersection without erroneously stopping within the intersection and rendering a hazardous situation therein.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
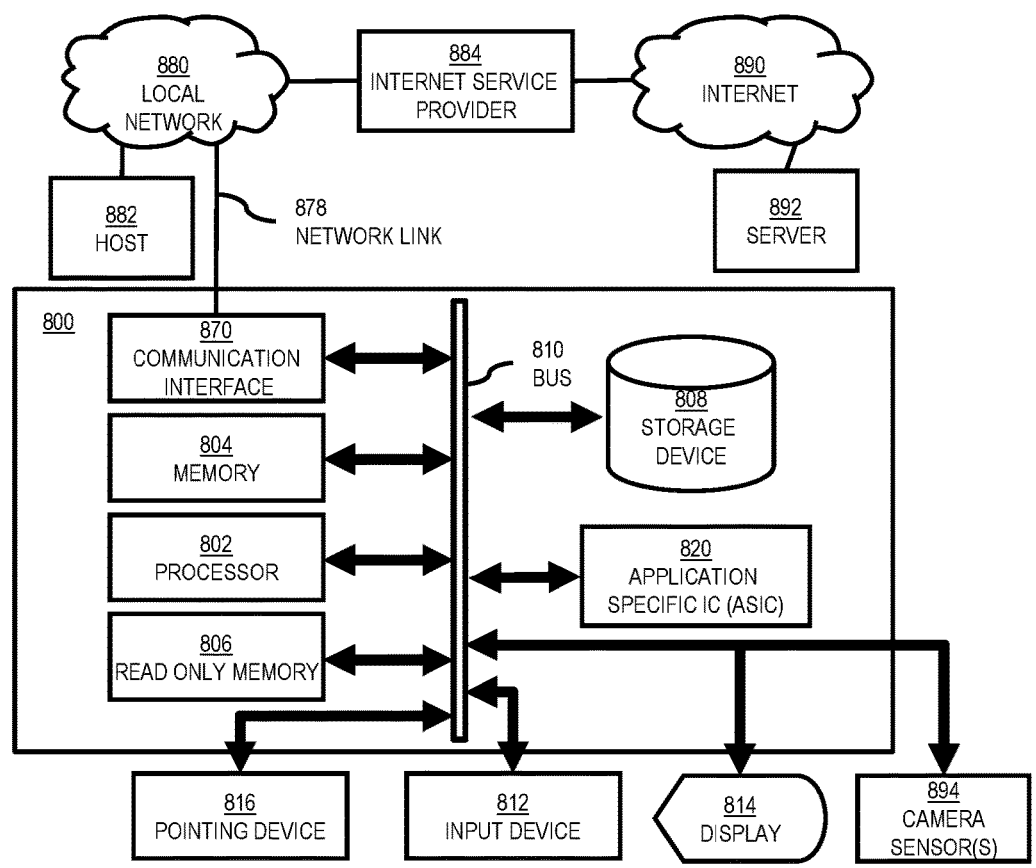
FIG. 8 illustrates a computer system upon which an embodiment may be implemented.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide audio-based navigation as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing autonomous vehicle navigation at intersections.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing autonomous vehicle navigation at intersections. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 800 also includes a memory 804 coupled to bus 810. The memory 804, such as a random access memory (RAM) or any other dynamic storage device, stores information including processor instructions for providing autonomous vehicle navigation at intersections. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing autonomous vehicle navigation at intersections, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.) which also may comprise audio recordings. In some embodiments, for example, in embodiments in which the computer system 800 performs all functions automatically without human input, one or more of external input device 812, display device 814 and pointing device 816 may be omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 123 for providing autonomous vehicle navigation at intersections to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 882 connected to the Internet hosts a process that provides a service in response to information received over the Internet. For example, server host 882 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 882 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide autonomous vehicle navigation at intersections as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing autonomous vehicle navigation at intersections.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real-time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors. The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide autonomous vehicle navigation at intersections. The memory 905 also stores the data associated with or generated by the execution of the inventive steps.

Figure 10:
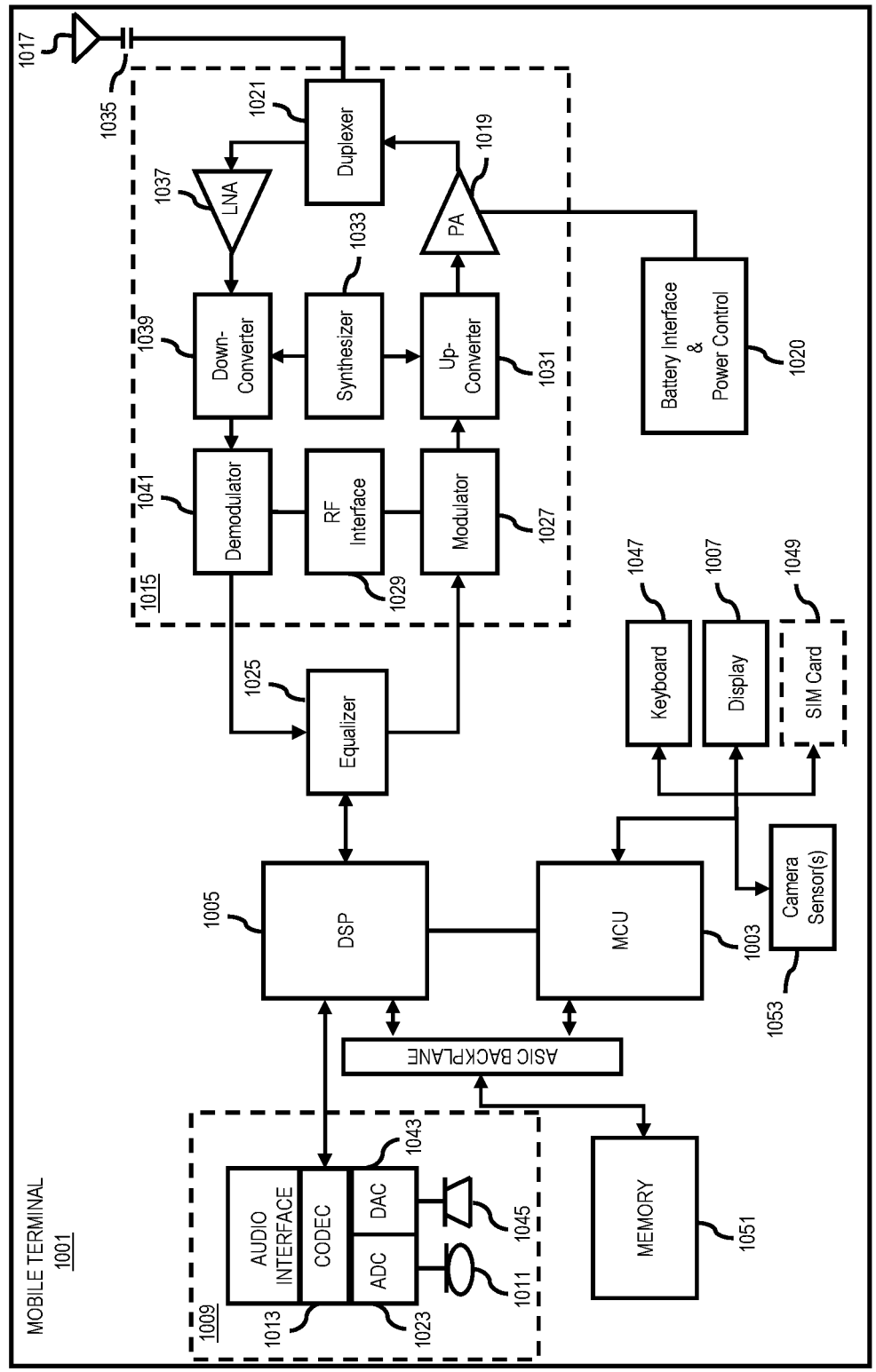
FIG. 10 illustrates a diagram of exemplary components of a mobile terminal for communications, which is capable of operating in the system of FIG. 2.

FIG. 10 is a diagram of exemplary components of a mobile terminal 1001 (e.g., a mobile device or vehicle or part thereof) for communications, which is capable of operating in the system of FIG. 2, according to one embodiment. In some embodiments, mobile terminal 1001, or a portion thereof, constitutes a means for performing one or more steps of providing autonomous vehicle navigation at intersections. Generally, a radio receiver is often defined in terms of front-end and back-end characteristics. The front-end of the receiver encompasses all of the Radio Frequency (RF)

circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing autonomous vehicle navigation at intersections. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide autonomous vehicle navigation at intersections. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1010 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1149 also contains a memory for storing a personal telephone number registry, text messages, and user specific mobile terminal settings.

Further, one or more camera sensors 1053 may be incorporated onto the mobile station 1001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
   identify an intersection associated with at least two road signs having the same sign type and facing the same direction;
   define a zone within the intersection based on attributes of the intersection;
   update map data to include a datapoint that provides a representation of a single road sign at the intersection instead of the at least two road signs; and
   cause an autonomous vehicle to traverse the intersection based on the datapoint and the zone, wherein the autonomous vehicle is instructed to not stop within the zone unless the autonomous vehicle detects an obstruction within the zone.

2. The apparatus of claim 1, wherein, to identify the intersection associated with the at least road signs, the computer program code instructions are configured to, when executed, cause the apparatus to:
   identify a functional class of the intersection;
   determine a size of a space for identifying all road signs within the intersection or one or more peripherals of the intersection based on the functional class;
   identify all road signs within the space at a location of the intersection; and
   for each identified road sign, determine attributes associated with said identified road sign.

3. The apparatus of claim 2, wherein the attributes indicate a sign type of said identified road sign, an orientation of said identified road sign, a position of said identified road sign with respect to the intersection, or a combination thereof.

4. The apparatus of claim 2, wherein, to determine the size of the space, the computer program code instructions are configured to, when executed, cause the apparatus to:
   responsive to the functional class being a first class, set the size of the space as a first size; and
   responsive to the functional class being a second greater class, set the size of the space as a second greater size.

5. The apparatus of claim 1, wherein, to identify the intersection associated with the at least road signs, the computer program code instructions are configured to, when executed, cause the apparatus to:
   identify a width of the intersection;
   determine a size of a space for identifying all road signs are within the intersection or one or more peripherals of the intersection based on the width;
   identify all road signs within the space at a location of the intersection; and
   for each identified road sign, determine attributes associated with said identified road sign.

6. The apparatus of claim 5, wherein, to determine the size of the space, the computer program code instructions are configured to, when executed, cause the apparatus to:
   responsive to the width being a first width, set the size of the space as a first size; and
   responsive to the width being a second greater width, set the size of the space as a second greater size.

7. A non-transitory computer-readable storage medium having computer program code instructions stored therein, the computer program code instructions, when executed by at least one processor, cause the at least one processor to:
   identify an intersection associated with at least two road signs having the same sign type and facing the same direction;
   define a zone within the intersection based on attributes of the intersection; and
   update map data to include a datapoint indicating an autonomous vehicle maneuver instruction, wherein the autonomous vehicle maneuver instruction instructs an autonomous vehicle traversing the intersection to not stop within the zone unless the autonomous vehicle detects an obstruction within the zone.

8. The non-transitory computer-readable storage medium of claim 7, wherein, to identify the intersection associated with the at least road signs, the computer program code instructions, when executed by the at least one processor, cause the at least one processor to:
   identify a functional class of the intersection;
   determine a size of a space for identifying all road signs within the intersection or one or more peripherals of the intersection based on the functional class;
   identify all road signs within the space at a location of the intersection; and
   for each identified road sign, determine attributes associated with said identified road sign.

9. The non-transitory computer-readable storage medium of claim 8, wherein the attributes indicate a sign type of said identified road sign, an orientation of said identified road sign, a position of said identified road sign with respect to the intersection, or a combination thereof.

10. The non-transitory computer-readable storage medium of claim 8, wherein, to determine the size of the space, the computer program code instructions, when executed by the at least one processor, cause the at least one processor to:
    responsive to the functional class being a first class, set the size of the space as a first size; and
    responsive to the functional class being a second greater class, set the size of the space as a second greater size.

11. The non-transitory computer-readable storage medium of claim 7, wherein, to identify the intersection associated with the at least road signs, the computer program code instructions, when executed by the at least one processor, cause the at least one processor to:
- identify a width of the intersection;
- determine a size of a space for identifying all road signs are within the intersection or one or more peripherals of the intersection based on the width;
- identify all road signs within the space at a location of the intersection; and
- for each identified road sign, determine attributes associated with said identified road sign.

12. The non-transitory computer-readable storage medium of claim 11, wherein, to determine the size of the space, the computer program code instructions, when executed by the at least one processor, cause the at least one processor to:
- responsive to the width being a first width, set the size of the space as a first size; and
- responsive to the width being a second greater width, set the size of the space as a second greater size.

13. The non-transitory computer-readable storage medium of claim 7, wherein the computer program code instructions, when executed by the at least one processor, cause the at least one processor to transmit the map data to the autonomous vehicle, wherein the autonomous vehicle maneuver instruction is executed for the autonomous vehicle in response to the autonomous vehicle reaching the intersection.

14. The non-transitory computer-readable storage medium of claim 13, wherein the autonomous vehicle maneuver instruction is executed for the autonomous vehicle in response to the autonomous vehicle facing sign faces of the at least two road signs.

15. A method of providing autonomous vehicle navigation, the method comprising:
- receiving sensor data from an autonomous vehicle;
- determining whether the sensor data indicate detection of at least two road signs having the same sign type and facing the same direction within an intersection or within one or more peripherals of the intersection;
- responsive to the sensor data indicating the detection, defining a zone within the intersection based on attributes of the intersection; and
- generating an autonomous vehicle maneuver signal, wherein the autonomous vehicle maneuver signal causes the autonomous vehicle to not stop within the zone unless the autonomous vehicle detects an obstruction within the zone.

16. The method of claim 15, further comprising, responsive to the autonomous vehicle reaching the intersection, transmitting the autonomous vehicle maneuver signal to the autonomous vehicle.

17. The method of claim 15, further comprising:
- receiving data indicating a travel direction of the autonomous vehicle; and
- determining whether the autonomous vehicle faces sign faces of the at least two road signs, transmitting the autonomous vehicle maneuver signal to the autonomous vehicle.

18. The method of claim 15, wherein the determining comprises:
- identifying a functional class of the intersection;
- determining a size of a space for identifying all road signs are within the intersection or the one or more peripherals based on the functional class;
- identifying all road signs within the space at a location of the intersection; and
- for each identified road sign, determining attributes associated with said identified road sign.

19. The apparatus of claim 1, wherein the attributes of the intersection are curvatures of the intersection, lane markings within the intersection, or a combination thereof.

20. The apparatus of claim 2, wherein the space increases as the functional class provides greater mobility for vehicles.

* * * * *